United States Patent
Lee et al.

(10) Patent No.: US 10,773,605 B2
(45) Date of Patent: *Sep. 15, 2020

(54) METHOD AND RECHARGING SYSTEM FOR AUTOMATICALLY SELECTING RECHARGING MODE

(71) Applicants: Hyundai Motor Company, Seoul (KR); Kia Motors Corporation, Seoul (KR)

(72) Inventors: So Jin Lee, Gyeonggi-Do (KR); Ji Hwon Kim, Gyeonggi-Do (KR); Chang Min Yang, Gyeonggi-Do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 64 days.

This patent is subject to a terminal disclaimer.

(21) Appl. No.: 16/169,814

(22) Filed: Oct. 24, 2018

(65) Prior Publication Data

US 2019/0061548 A1  Feb. 28, 2019

Related U.S. Application Data

(63) Continuation of application No. 15/000,823, filed on Jan. 19, 2016, now Pat. No. 10,131,241.

(30) Foreign Application Priority Data

Oct. 26, 2015  (KR) .................. 10-2015-0148899

(51) Int. Cl.
*B60L 53/60* (2019.01)
*B60L 53/66* (2019.01)
(Continued)

(52) U.S. Cl.
CPC .......... *B60L 53/66* (2019.02); *B60L 11/1844* (2013.01); *B60L 53/11* (2019.02); *B60L 53/14* (2019.02);
(Continued)

(58) Field of Classification Search
CPC ..... Y02T 90/14; Y02T 90/128; Y02T 90/163; Y02T 10/7088; Y02T 90/121;
(Continued)

(56) References Cited

U.S. PATENT DOCUMENTS

| | | | |
|---|---|---|---|
| 2015/0097525 | A1 | 4/2015 | DeDona et al. |
| 2015/0115873 | A1 | 4/2015 | Lee et al. |

(Continued)

FOREIGN PATENT DOCUMENTS

| | | |
|---|---|---|
| CN | 104037834 A | 9/2014 |
| CN | 104467079 A | 3/2015 |

(Continued)

OTHER PUBLICATIONS

Office Action in corresponding Chinese Application No. 201610140384.6 dated Apr. 24, 2020.

*Primary Examiner* — Nathaniel R Pelton
*Assistant Examiner* — Mohammed J Sharief
(74) *Attorney, Agent, or Firm* — Mintz Levin Cohn Ferris Glovsky and Popeo, P.C.; Peter F. Corless

(57) ABSTRACT

A method for automatically selecting a recharging mode of an electric vehicle includes: identifying a first recharging mode corresponding to a duty cycle of a received pulse width modulation signal, performing a first recharge process corresponding to the identified first recharging mode, identifying a second recharging mode according to the duty cycle of the received pulse width modulation signal when the first recharge process fails; and performing a second recharge (Continued)

process corresponding to the second recharging mode when the second recharging mode is identified.

7 Claims, 7 Drawing Sheets

(51) Int. Cl.
  *B60L 11/18*    (2006.01)
  *B60L 53/63*    (2019.01)
  *B60L 53/14*    (2019.01)
  *B60L 53/10*    (2019.01)
  *B60L 53/62*    (2019.01)

(52) U.S. Cl.
  CPC .............. *B60L 53/62* (2019.02); *B60L 53/63* (2019.02); *B60L 2250/16* (2013.01); *Y02E 60/721* (2013.01); *Y02T 10/7005* (2013.01); *Y02T 10/7072* (2013.01); *Y02T 90/121* (2013.01); *Y02T 90/128* (2013.01); *Y02T 90/14* (2013.01); *Y04S 10/126* (2013.01)

(58) Field of Classification Search
  CPC ............ Y02T 10/7005; Y02T 10/7072; B60L 11/1844; B60L 53/63; B60L 53/14; B60L 53/60; B60L 53/11; B60L 2250/16; Y04S 10/126; Y02E 60/721; H02J 7/00
  USPC ........................................................ 320/109
  See application file for complete search history.

(56) References Cited

U.S. PATENT DOCUMENTS

| | | |
|---|---|---|
| 2015/0175020 A1 | 6/2015 | Kim et al. |
| 2015/0280485 A1 | 10/2015 | Wang |
| 2015/0329000 A1* | 11/2015 | Kim .................... B60L 11/1818 320/109 |
| 2015/0352967 A1 | 12/2015 | Timpf, Jr. et al. |
| 2016/0064959 A1* | 3/2016 | Jung ....................... G06F 1/263 320/162 |
| 2017/0113563 A1* | 4/2017 | Lee ......................... B60L 53/11 |

FOREIGN PATENT DOCUMENTS

| | | |
|---|---|---|
| CN | 104734274 A | 6/2015 |
| JP | 2009-077557 A | 4/2009 |
| JP | 2011-223796 A | 4/2011 |
| JP | 2011-229344 A | 11/2011 |
| JP | 2013-085420 A | 5/2013 |
| KR | 10-2011-0043861 A | 4/2011 |
| KR | 10-1308711 B1 | 9/2013 |
| KR | 2013-0120230 A | 11/2013 |
| KR | 10-1488586 B1 | 2/2015 |
| KR | 10-1490958 B1 | 2/2015 |
| KR | 10-1512879 B1 | 4/2015 |
| KR | 10-2015-0075630 A | 7/2015 |
| KR | 10-2015-0112459 A | 10/2015 |

* cited by examiner

METHOD AND RECHARGING SYSTEM FOR AUTOMATICALLY SELECTING RECHARGING MODE

CROSS-REFERENCE TO RELATED APPLICATION

This application is continuation application to U.S. application Ser. No. 15/000,823, filed on Jan. 19, 2016, which claims the benefit of and priority to Korean Patent Application No. 10-2015-0148899, filed on Oct. 26, 2015, which are hereby incorporated by reference as if fully set forth herein.

BACKGROUND OF THE DISCLOSURE

Technical Field

The present disclosure relates generally to electric vehicle recharging technologies, and more particularly, to a method and recharging system for automatically selecting a recharging mode of an electric vehicle, for automatically selecting a recharging mode between the electric vehicle, and a charger.

Discussion of the Related Art

In the past, electric vehicles were developed among diesel and gasoline engine vehicles but eventually disappeared from the general car market due to mass supply of oil fuel. However, as environmental pollution has attracted much attention, the electric vehicle market has re-emerged due to various exhaust regulations and high oil prices. In order to expand the electric vehicle market, a reliable recharging infrastructure needs to be developed, but it is difficult to install a power supply network with a uniform level due to the characteristics of chargers to be installed at various locations.

Accordingly, the importance of basic signal processing technologies between an electric vehicle and an electric vehicle charger, which are defined according to International standards, has steadily increased. Various standards for recharging an electric vehicle are defined, and among theses, DC combo is a representative method.

A DC combo (type 1) method may refer to a method in which an alternating current (AC) connector used for slow recharge and a direct current (DC) connector for quick recharge are integrated into one power inlet socket. It is advantageous for increasing spatial efficiency because both slow and quick recharge can be performed in one inlet.

In the DC combo method, when any one of a slow recharging mode and a quick recharging mode is selected in a charger, the charger transmits a signal in a manner of pulse width modulation (PWM) corresponding to the selected mode to a vehicle. For example, in the case of the quick recharging mode, a duty cycle (i.e., a ratio of H and L signals of a pulse width) of a PWM signal may be defined in the range of 3% to 7%, and in the case of the slow recharging mode, a duty cycle of a PWM signal may be defined in the range of 10% to 96%.

Meanwhile, in the case of a conventional combo method using a quick/slow integration connector, when an integration recharge connector included in a charger is connected to an electric vehicle recharge inlet, a screen included in the charger may display a predetermined user interface image for selection of a recharging mode. In this case, when the quick mode is selected, a quick recharge process using power line communication (PLC) is performed, and when the slow mode is selected, a slow recharge process using PLC is performed.

However, conventionally, when the quick mode is selected and the quick recharge process is performed, if quick recharge fails, a user is inconvenienced by being forced to remove an integration recharge connector inserted into an electric vehicle recharge inlet, re-insert the integration recharge connector into the electric vehicle recharge inlet, and then select a slow mode on the image to perform slow recharge.

SUMMARY OF THE DISCLOSURE

Accordingly, the present disclosure is directed to a method and recharging system for automatically selecting a recharging mode that substantially obviates one or more problems due to limitations and disadvantages of the related art.

An object of the present disclosure is to provide a method and recharging system for automatically selecting a recharging mode.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these objects and other advantages and in accordance with the purpose of the disclosure, as embodied and broadly described herein, a method for automatically selecting a recharging mode of an electric vehicle includes: identifying a first recharging mode corresponding to a duty cycle of a received pulse width modulation signal, performing a first recharge process corresponding to the identified first recharging mode, identifying a second recharging mode according to the duty cycle of the received pulse width modulation signal when the first recharge process fails, and performing a second recharge process corresponding to the second recharging mode when the second recharging mode is identified.

The pulse width modulation signal may be received from a charger through a control pilot port installed in an inlet of the electric vehicle.

The first recharging mode may be a quick recharging mode, and the second recharging mode may be a slow recharging mode.

The duty cycle corresponding to the first recharging mode may be less than the duty cycle corresponding to the second recharging mode.

The method may further include determining that recharging is completed when a duty cycle of the pulse width modulation signal is 100%.

The first recharging mode may be a slow recharging mode, and the second recharging mode may be a quick recharging mode.

The duty cycle corresponding to the first recharging mode may be greater than the duty cycle corresponding to the second recharging mode.

Furthermore, according to embodiments of the present disclosure, a method for automatically selecting a recharging mode of a charger includes: displaying a predetermined recharging mode selection image for receiving a selection of a recharging mode, displaying a predetermined automatic recharging conversion mode selection image for checking whether a current mode is automatically converted into a second recharging mode when a recharging mode selected via the recharging mode selection image is a first recharging mode, generating and transmitting a pulse width modulation signal having a duty cycle corresponding to the first recharging mode when automatic recharging conversion is activated via the automatic recharging conversion mode selection image, and generating and transmitting a pulse width modulation signal having a duty cycle corresponding to the second recharging mode when a first recharge process corresponding to the first recharging mode fails.

The pulse width modulation signal may be transmitted to an electric vehicle through a control pilot port included in a connector of the charger.

The first recharging mode may be a quick recharging mode, and the second recharging mode may be a slow recharging mode.

The duty cycle corresponding to the first recharging mode may be less than the duty cycle corresponding to the second recharging mode.

The method may further include generating and transmitting the pulse width modulation signal with a duty cycle of 100% upon completing recharging in the first recharging mode or the second recharging mode.

The first recharging mode may be a slow recharging mode, and the second recharging mode may be a quick recharging mode.

The duty cycle corresponding to the first recharging mode may be greater than the duty cycle corresponding to the second recharging mode.

Furthermore, according to embodiments of the present disclosure, an electric vehicle recharging system includes: an onboard charger identifying a recharging mode based on a duty cycle of a pulse width signal received through a control pilot port, a power line communication controller being activated by the onboard charger, performing power line communication with an external charger when the identified recharging mode is a quick recharging mode, and a battery being recharged with power received from the charger according to the identified recharging mode. Upon determining, by the power line communication controller, that a predetermined quick recharge process corresponding to the quick recharging mode fails, the onboard charger converts a current mode into a slow recharging mode based on a duty cycle of the pulse width modulation signal.

The quick recharge process may be performed via the power line communication using the control pilot port.

Power received from the external charger may be transmitted to the battery through the onboard charger when the current mode is converted into the slow recharging mode.

The power line communication controller may terminate the power line communication with the external charger when the current mode is converted into the slow recharging mode.

The duty cycle of the pulse width modulation signal corresponding to the quick recharging mode may be less than the duty cycle of the pulse width modulation signal corresponding to the slow recharging mode.

Furthermore, according to embodiments of the present disclosure, a charger includes: a display unit displaying a predetermined recharging mode selection image for receiving a selection of a recharging mode and a predetermined automatic recharging conversion mode selection image for determining whether a first charging mode is automatically converted into a second recharging mode when a recharging mode selected via the recharging mode selection image is the first charging mode; a communication unit transmitting and receiving a power line communication signal to and from an electric vehicle, generating a pulse width modulation signal, and transmitting the pulse width modulation signal to the electric vehicle; and a controller controlling the communication unit so as to generate and transmit a pulse width modulation signal having a duty cycle corresponding to the first recharging mode when automatic recharging conversion is activated via the automatic recharging conversion mode selection image, and controlling the communication unit so as to generate and transmit a pulse width modulation signal having a duty cycle corresponding to the second recharging mode when a first recharge process corresponding to the first recharging mode fails.

The first recharging mode may be a quick recharging mode, and the second recharging mode may be a slow recharging mode.

The duty cycle corresponding to the first recharging mode may be less than the duty cycle corresponding to the second recharging mode.

The controller may control the communication unit so as to generate and transmit the pulse width modulation signal with a duty cycle of 100% upon completing recharging in the first recharging mode or the second recharging mode.

The first recharging mode may be a slow recharging mode, and the second recharging mode may be a quick recharging mode.

The duty cycle corresponding to the first recharging mode may be greater than the duty cycle corresponding to the second recharging mode.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

DETAILED DESCRIPTION OF THE EMBODIMENTS

Figure 1:
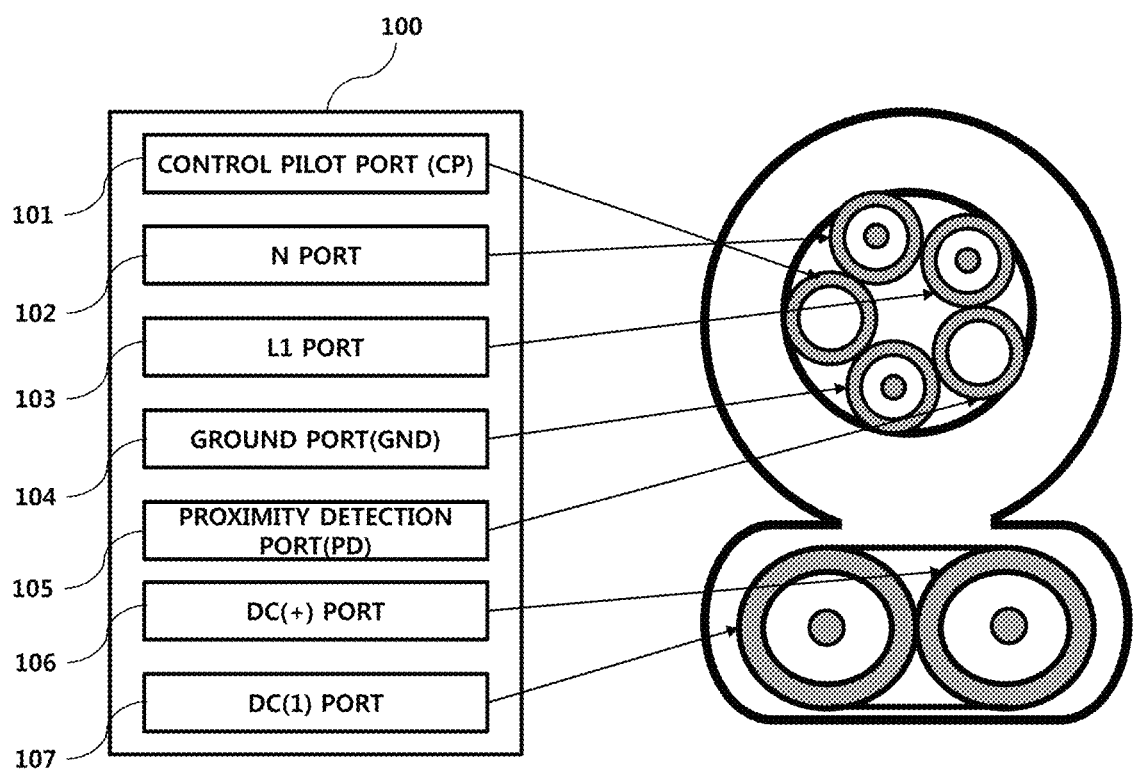
FIG. 1 is a diagram for explanation of an electric vehicle inlet using a combo method according to embodiments of the present disclosure.

Reference will now be made in detail to the embodiments of the present disclosure, examples of which are illustrated in the accompanying drawings. The suffixes "module" and "unit" of elements herein are used for convenience of description and thus can be used interchangeably and do not have any distinguishable meanings or functions.

Although all elements constituting the embodiments of the present disclosure are described as integrated into a single one or to be operated as a single one, the present disclosure is not necessarily limited to such embodiments. According to embodiments, all of the elements may be selectively integrated into one or more and be operated as one or more within the object and the scope of the present disclosure. Each of the elements may be implemented as independent hardware. Alternatively, some or all of the elements may be selectively combined into a computer program having a program module performing some or all functions combined in one or more pieces of hardware. A plurality of codes and code segments constituting the computer program may be easily understood by those skilled in the art to which the present disclosure pertains. The computer program may be stored in computer readable media such that the computer program is read and executed by a computer to implement embodiments of the present disclosure. Computer program storage media may include magnetic recording media, optical recording media, and carrier wave media.

The term "comprises", "includes", or "has" described herein should be interpreted not to exclude other elements but to further include such other elements since the corresponding elements may be included unless mentioned otherwise. All terms including technical or scientific terms have the same meanings as generally understood by a person having ordinary skill in the art to which the present disclosure pertains unless mentioned otherwise. Generally used terms, such as terms defined in a dictionary, should be interpreted to coincide with meanings of the related art from the context. Unless differently defined in the present disclosure, such terms should not be interpreted in an ideal or excessively formal manner.

It will be understood that, although the terms first, second, A, B, (a), (b), etc. may be used herein to describe various elements of the present disclosure, these terms are only used to distinguish one element from another element and essential, order, or sequence of corresponding elements are not limited by these terms. It will be understood that when one element is referred to as being "connected to", "coupled to", or "access" another element, one element may be "connected to", "coupled to", or "access" another element via a further element although one element may be directly connected to or directly access another element.

In the description of the present disclosure, certain detailed explanations of related art are omitted when it is deemed that they may unnecessarily obscure the essence of the disclosure. The features of the present disclosure will be more clearly understood from the accompanying drawings and should not be limited by the accompanying drawings, and it is to be appreciated that all changes, equivalents, and substitutes that do not depart from the spirit and technical scope of the present disclosure are encompassed in the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one controller. The term "controller" may refer to a hardware device that includes a memory and a processor. The memory is configured to store program instructions, and the processor is specifically programmed to execute the program instructions to perform one or more processes which are described further below. Moreover, it is understood that the below methods may be executed by an apparatus comprising the controller in conjunction with one or more other components, as would be appreciated by a person of ordinary skill in the art.

As described above, in the DC combo method, any one of a controller for slow recharge and a controller for quick recharge is responsible for a recharge process through basic signal processing based on a PWM signal and voltage. In this situation, in order to prevent mode selection failure due to noise of the PWM signal, embodiments of the present disclosure proposes that each of the controllers responsible for different recharge methods may measure a duty ratio of the PWM signal and transmits the duty ratio to a battery management system (BMS). Accordingly, the BMS may select any one of recharging modes using the two measured values and transmit the selection result to each control such that recharging proceeds in a mode according to the selection result.

Here, the controller is responsible for the respective recharge methods and the BMS may exchanges signals via CAN communication, and the PWM signal may be transmitted to a vehicle from a charger through a control pilot line of a recharge connector. The control pilot line may refer to a communication line for recharge level adjustment and exchanging other information items between a charger and a vehicle.

In addition, slow recharge may be mainly performed an on-board charger (OBC) through signal processing based on a PWM signal and voltage, and quick recharge may be performed by activating a power line communication controller and a battery management controller (BMC) when an OBC recognizes quick recharge through a PWM signal and power line communication (PLC).

FIG. 1 is a diagram for explanation of an electric vehicle inlet 100 using a combo method, which is installed in an electric vehicle according to embodiments of the present disclosure.

As shown in FIG. 1, the electric vehicle inlet 100 may include a control pilot (CP) port 101, an N port 102, an L1 port 103, a ground port GND 104, a proximity detection (PD) port 105, a DC(+) port 106, and a DC(−) port 107.

The CP port 101 may be a port for transmitting and receiving power line communication (PLC) and pulse width modulation (PWM) signals between an electric vehicle and a charger. The charger may transmit the PWM to the electric vehicle through a CP link and signal whether a quick recharge process or a slow recharge process is initiated via duty cycle control of the PWM signal. Upon identifying a duty cycle of the received PWM signal to check the initiated recharging mode, the electric vehicle may perform a recharge process according to the checked recharging mode together with the charger through power line communication.

For example, when the duty cycle of the PWM signal is 5%, the electric vehicle may initiate a quick recharge process, when the duty cycle is 20%, the electric vehicle may initiate a slow recharge process, and when the duty cycle is 100%, the electric vehicle may recognize that recharging is terminated. However, it is noted that this is merely an example of the duty cycle and that values of duty ratios corresponding to the quick recharging mode and the slow recharging mode are different according to design of ordinary skill in the art.

The N port 102 and the L1 port 103 may be used for power transmission in the slow recharging mode.

The ground port GND 104 may be used for supplying a ground signal to a power line communication controller and an on-board charger (OBC) of the electric vehicle.

The proximity detection (PD) port 105 may be a port for detection of proximity to the electric vehicle inlet of the recharge connector, and in this regard, when the recharge connector is connected to the electric vehicle inlet, the charger may configure and display a predetermined user interface image for selection of a recharging mode.

The DC(+) port 106 and the DC(−) port 107 may be ports for quick recharge and may be connected directly to a battery of the electric vehicle.

Figure 2:
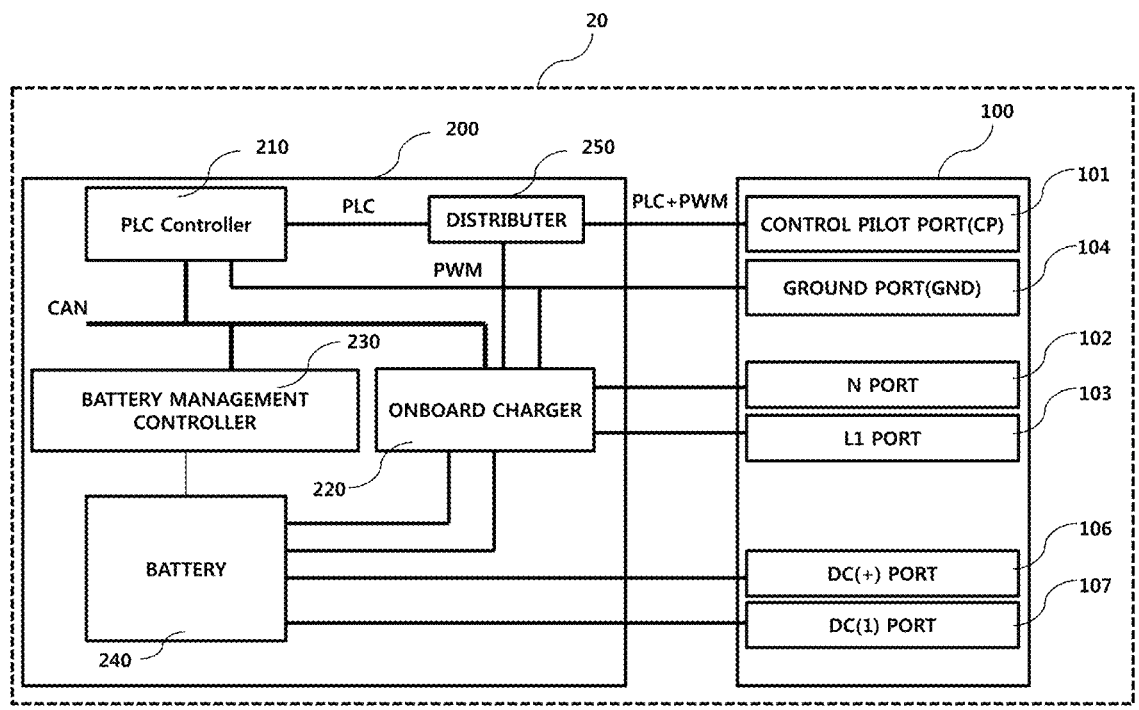
FIG. 2 is a diagram for explanation of a structure of an electric vehicle recharge system according to embodiments of the present disclosure.

FIG. 2 is a diagram for explanation of a structure of an electric vehicle recharge system according to embodiments of the present disclosure.

As shown in FIG. 2, an electric vehicle 20 may include a recharging control apparatus 200 including various controllers for control of electric vehicle recharging and a battery, and the electric vehicle inlet 100 including a connection port that transmits and receives various control signals to and from a charger and receives power from the charger upon being connected to a recharge connector included in the charger.

The recharging control apparatus 200 may include a PLC controller 210, an onboard charger 220, a battery management controller 230, and a battery 240.

The PLC controller 210 may be connected to the onboard charger 220 and the battery management controller 230 through a CAN communication line to perform CAN communication.

Signals received through the CP port 101 may be distributed to the PLC controller 210 and the onboard charger 220. In this case, the CP port 101 may receive a power line communication single through the CP port 101 and the onboard charger 220 may receive a PWM signal. To this end, a predetermined distributer 250 for distributing a PLC signal and PWM signal that are received through the CP port 101 may be further disposed at one side of a CP line of the recharging control apparatus 200, which is merely an embodiment. Thus, according to another embodiment of the present disclosure, PLC+PWM signals—that is, mixed signals—may be forwarded to the PLC controller 210 and the onboard charger 220, and the PLC controller 210 and the onboard charger 220 may internally extract a PLC signal and a PWM signal from the mixed signals.

The onboard charger 220 may calculate a duty cycle of the PWM signal and identify the initiated recharging mode based on the calculated duty cycle.

Upon determining that the quick recharging mode is selected according to the calculated duty cycle, the onboard charger 220 may activate the PLC controller 210 and the battery management controller 230.

The PLC controller 210 may initiate a recharge process according to the recharging mode identified by the onboard charger 220.

For example, the PLC controller 210 may transmit information about a communication protocol supportable by the electric vehicle to the charger via power line communication, and the charger may select any one of supportable communication protocols received from the PLC controller 210 and transmit information of the selected communication protocol to the PLC controller 210 via power line communication. When a communication protocol selectable by the charger is not present, the charger may transmit a predetermined control signal indicating that selection of a communication protocol fails to the PLC controller 210 through power line communication. When the quick recharging mode is selected, if communication protocol negotiation between the PLC controller 210 and the charger fails, the PLC controller 210 may automatically convert the current mode to a slow recharging mode to initiate the slow recharge process.

As another example, the PLC controller 210 may transmit a predetermined recharge request message containing requested power information to the charger via power line communication. In this case, when the requested power cannot be supplied or a predetermined recharge parameter contained in the recharge request message is not valid, the charger may transmit a predetermined control signal indicating that recharging is impossible to the PLC controller 210 via power line communication and then initiate a PLC communication terminating procedure. In this case, the PLC controller 210 may signal failure in quick recharge to the battery management controller 230 and the onboard charger 220 via CAN communication. According to embodiments of the present disclosure, upon determining that quick recharge fails and receiving a predetermined slow recharge response message from the charger after transmitting a predetermined slow recharge request message via power line communication, the PLC controller 210 may initiate PLC communication terminating procedure.

When the quick recharging mode is selected, if a quick recharge process fails due to transmission of a wrong recharge parameter between the PLC controller 210 and the charger, the PLC controller 210 may signal failure in quick recharge to the battery management controller 230 and the onboard charger 220 via CAN communication.

In general, conventionally, when quick recharge fails, a quick recharge process and power line communication are terminated, and a user is inconvenienced by removing a recharge connector from an electric vehicle inlet and re-connecting a separate slow recharge connector or re-selecting a slow recharging mode in a predetermined user interface.

However, when a quick recharge process fails, a charger according to embodiments of the present disclosure may automatically transmit a PWM signal corresponding to the slow recharging mode through a CP port to control an electric vehicle to be automatically converted into a slow recharging mode.

The slow recharge process according to the present disclosure does not require power line communication as high level communication, and thus upon detecting a PWM signal corresponding to the slow recharging mode, the onboard charger 220 may deactivate the PLC controller 210 and signal that a current mode is converted into a slow recharging mode to the battery management controller 230 via CAN communication. Then the onboard charger 220 may transmit power received from the N port 102 and the L1 port 103 to the battery 240.

Figure 3:
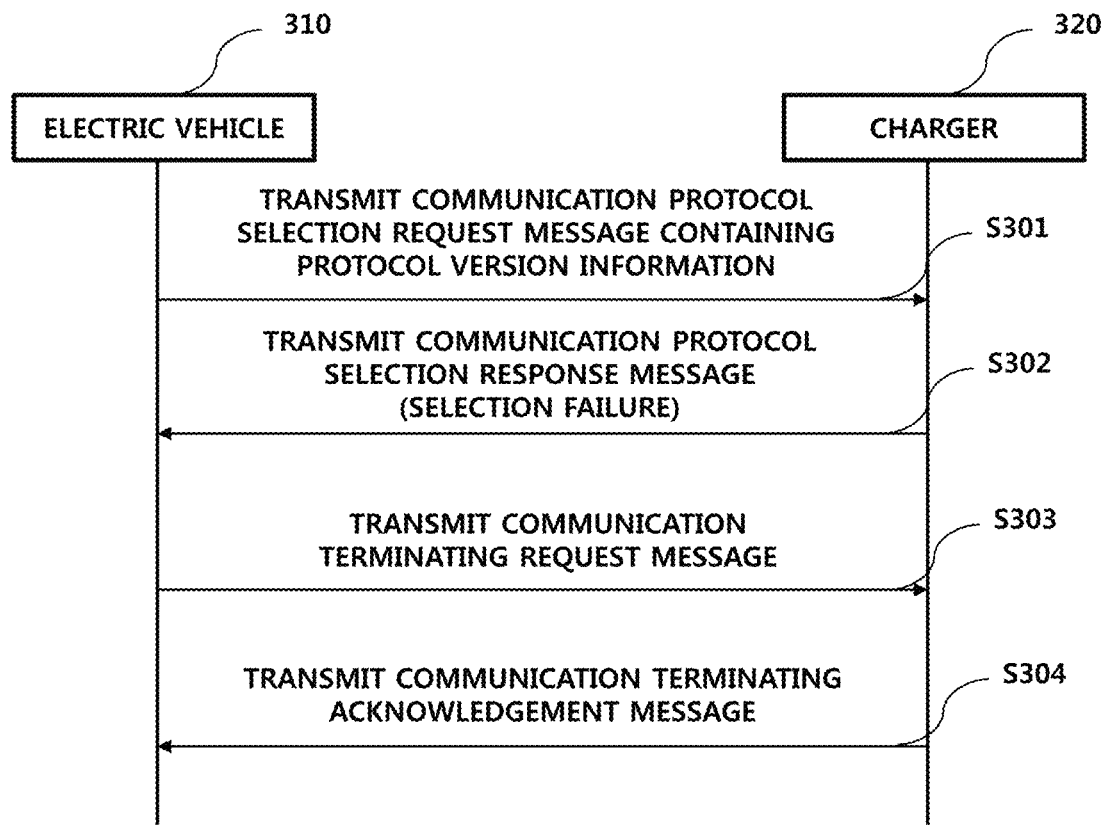
FIG. 3 is a flowchart for explanation of failure in quick recharge of an electric vehicle according to embodiments of the present disclosure.

FIG. 3 is a flowchart for explanation of failure in quick recharge of an electric vehicle 310 according to embodiments of the present disclosure.

As shown in FIG. 3, the electric vehicle 310 may transmit a communication protocol selection request message containing information about at least one supportable protocol version to a charger 320 via power line communication (S301).

The charger 320 may select any one of information items from the at least one supportable protocol version received from the electric vehicle 310 and transmit the selection result to the electric vehicle 310 via power line communication. When a communication protocol is selected by the charger 320, a session between the electric vehicle 310 and the charger 320 may be established using the selected communication protocol.

On the other hand, when a selectable communication version is not present from the at least one supportable protocol version received from the electric vehicle 310, the charger 320 may transmit a predetermined communication protocol selection response message indicating that communication protocol selection fails to the electric vehicle 310 via power line communication (S302).

In this case, the electric vehicle 310 may transmit a predetermined communication terminating request message to the charger 320, and the charger 320 may transmit a predetermined communication terminating acknowledgement message to the electric vehicle 310 to terminate power line communication (S303 to S304).

Figure 4:
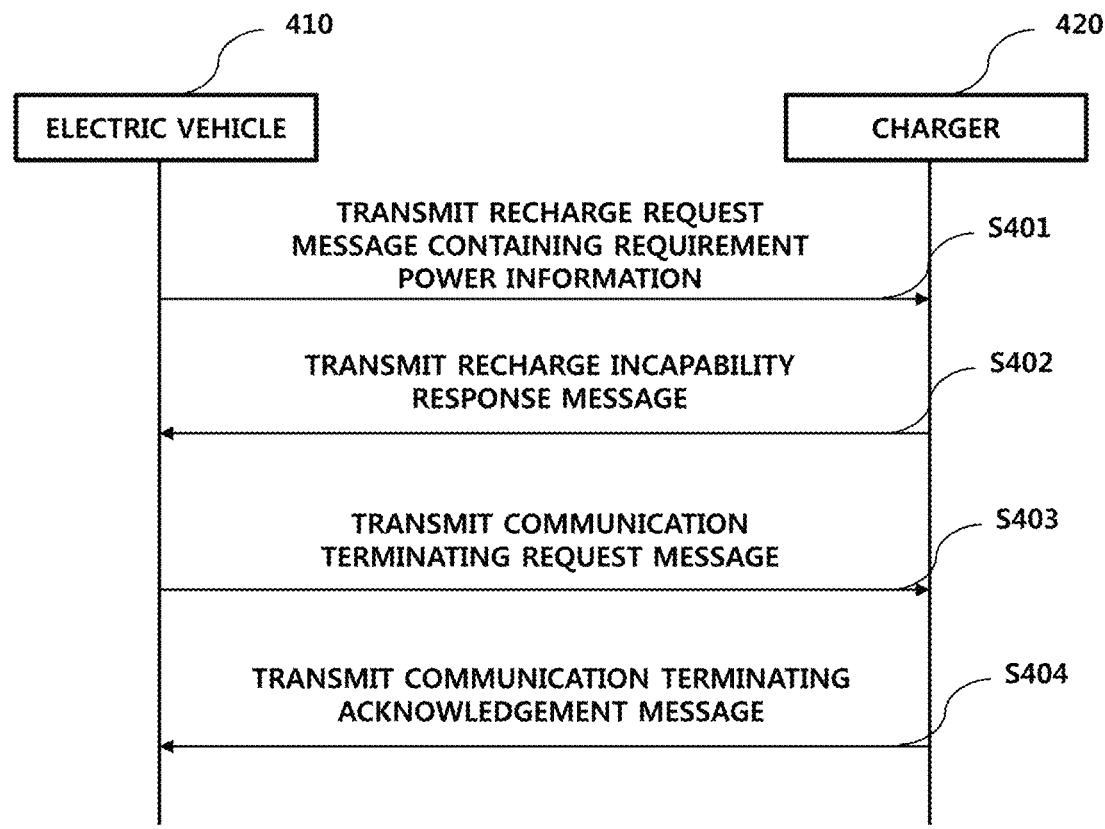
FIG. 4 is a flowchart for explanation of an example of failure in quick recharge of an electric vehicle according to embodiments of the present disclosure.

FIG. 4 is a flowchart for explanation of an example of failure in quick recharge of an electric vehicle 410 according to embodiments of the present disclosure.

In detail, FIG. 4 is a flowchart for explanation of an example of failure in recharge due to exchange of an invalid exchange parameter between the electric vehicle 410 and a charger 420.

As shown in FIG. 4, the electric vehicle 410 may transmit a predetermined recharge request message containing recharge related information—e.g., containing requirement power information—to the charger 420 via power line communication (S401).

The charger 420 may determine whether recharging is possible based on the received charging related information, and as the determination result, when recharging is impossible according to the corresponding recharge related information, the charger 420 may transmit a predetermined recharge incapability response message to the electric vehicle 410 via power line communication (S402).

In this case, the electric vehicle 410 may transmit a predetermined communication terminating request message to the charger 420, and the charger 420 may transmit a predetermined communication terminating acknowledgement message to the electric vehicle 410 to terminate power line communication (S403 to S404).

Figure 5:
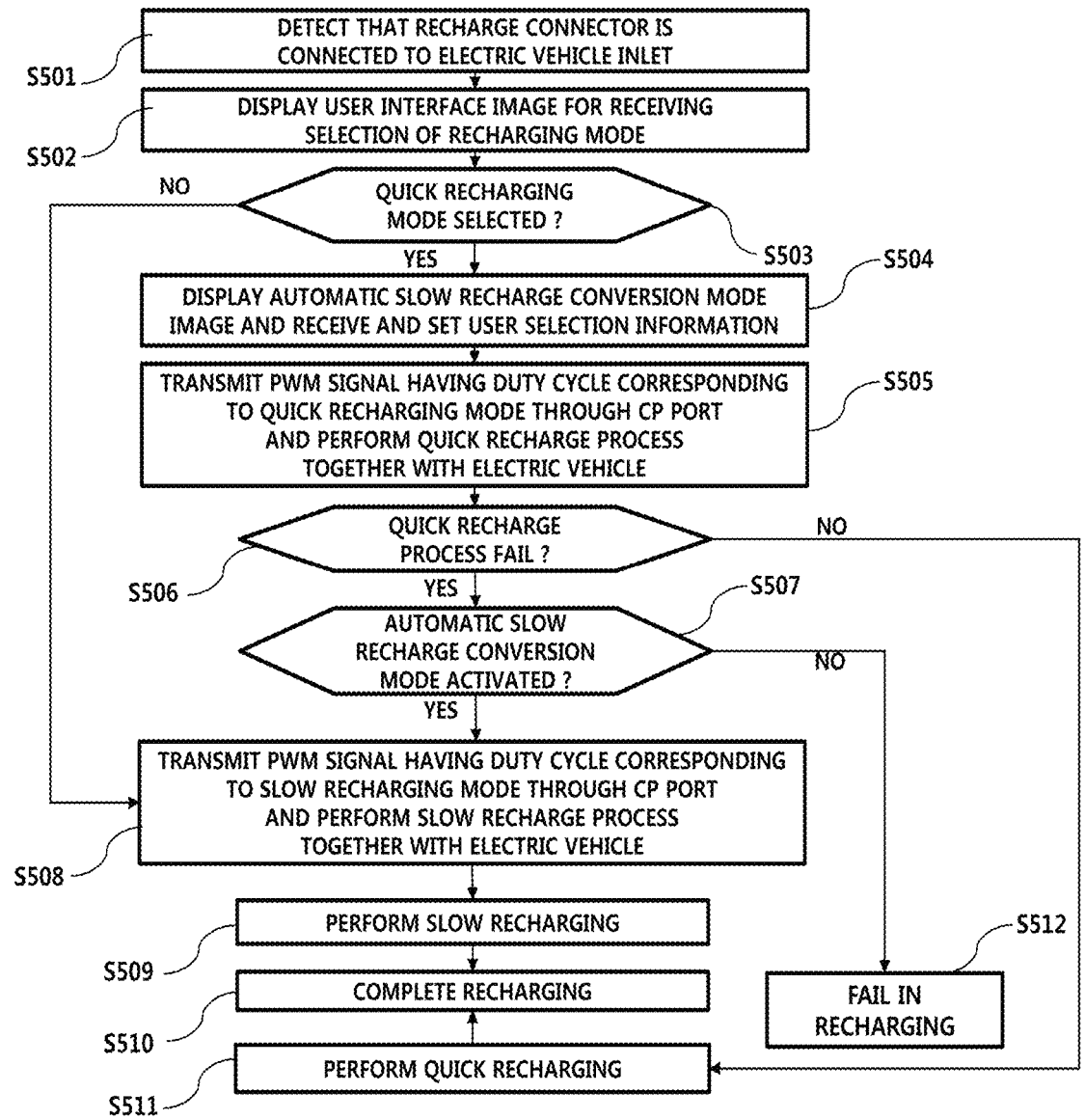
FIG. 5 is a flowchart for explanation of a method for automatically selecting a recharging mode in a charger according to embodiments of the present disclosure.

FIG. 5 is a flowchart for explanation of a method for automatically selecting a recharging mode in a charger according to embodiments of the present disclosure.

As shown in FIG. 5, the charger according to embodiments of the present disclosure may configure and display a predetermined user interface image for receiving selection of a recharging mode upon detecting that a recharge connector is connected to an electric vehicle inlet (S501 to S502).

As another example, the charger may configure and display a predetermined user interface image for receiving selection of a recharging mode according to predetermined menu selection in a display screen.

When a quick recharging mode is selected, the charger may configure and display an image for selection an automatic slow recharge conversion mode, acquire selection information of a user on the displayed image, and store the selection information in a predetermined recording region (S503 to S504).

The charger may generate a PWM signal having a duty cycle corresponding to the quick recharging mode, transmit the PWM signal to the electric vehicle through a control pilot port, and perform a quick recharge process (S505). Here, the quick recharge process may be initiated by a power line communication controller when a PWM signal corresponding to the quick recharging mode is detected by an onboard controller of the electric vehicle.

When the quick recharge process fails, the charger may check whether an automatic slow recharge conversion mode is activated (S506 to S507).

When the automatic slow recharge conversion mode is activated, the charger may generate a PWM signal having a duty cycle corresponding to the slow recharge mode and transmit the PWM signal through a control pilot port so as to perform the slow recharge process (S508).

Then when the charger performs slow recharge to complete recharging, the charger may generate a PWM signal having a duty cycle corresponding to recharging termination and transmit the PWM signal to the electric vehicle through a control pilot port (S509 to S510).

In operation 503 above, when a quick recharging mode is not selected, that is, when a slow recharge mode is selected, the charger may enter operation 508 above.

In addition, in operation 506 above, when the quick recharge process is successful, the charger may perform quick recharge (S511).

In addition, in operation 507 above, when the quick recharge process fails and an automatic slow recharge conversion mode is not activated, the charger may display a predetermined guide message indicating failure in recharging on a screen (S512).

Figure 6:
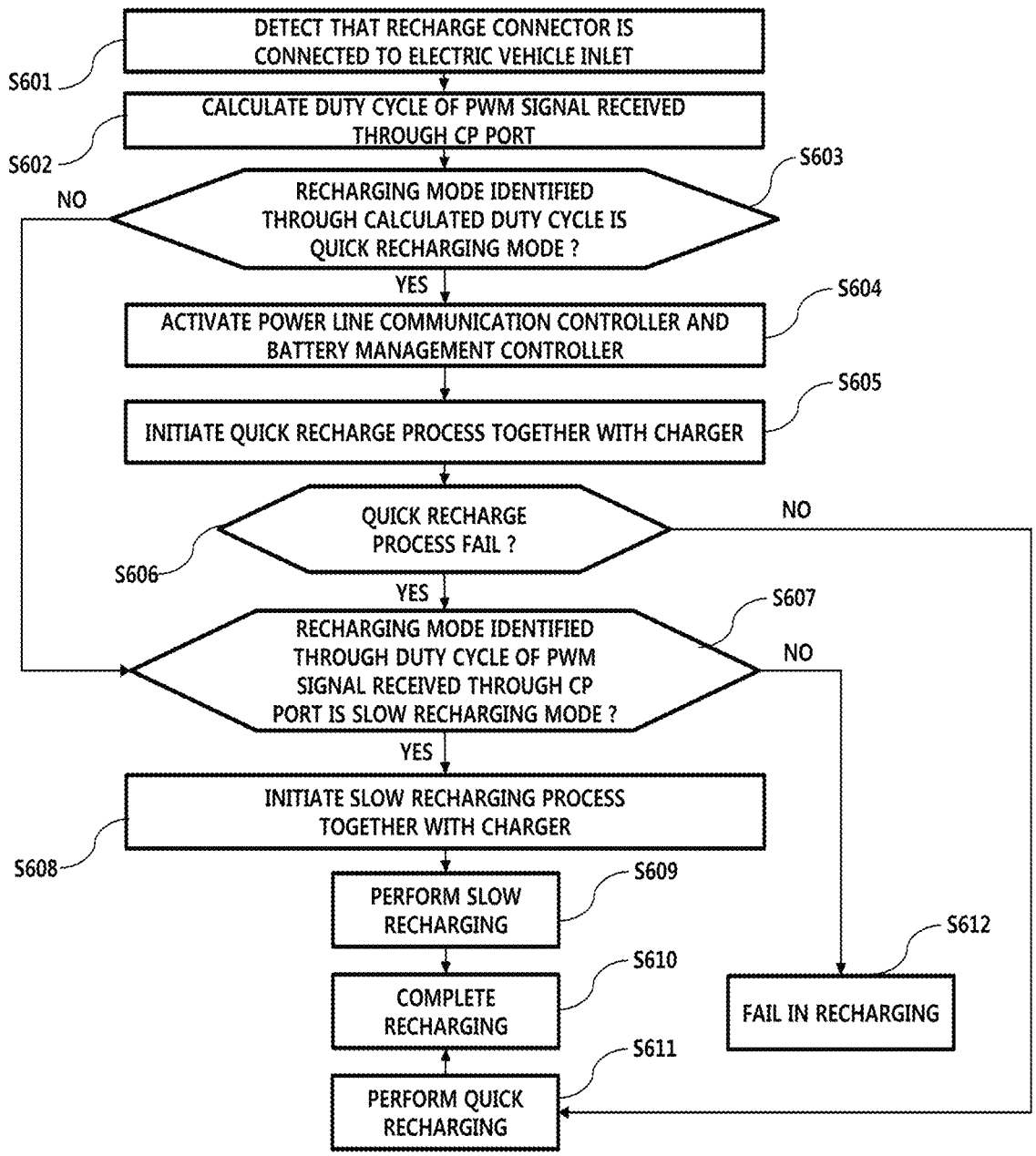
FIG. 6 is a flowchart for explanation of a method for automatically selecting a recharging mode in an electric vehicle according to embodiments of the present disclosure.

FIG. 6 is a flowchart for explanation of a method for automatically selecting a recharging mode in an electric vehicle according to embodiments of the present disclosure.

As shown in FIG. 6, upon detecting that a recharge connector is connected to an electric vehicle inlet, the electric vehicle may calculate a duty cycle of a PWM signal received through the control pilot port to identify a recharging mode (S602). Here, calculation of a duty cycle of a PWM signal and identification of a recharging mode may be performed by the onboard charger 220 of FIG. 2.

When a recharging mode corresponding to the calculated duty cycle is a quick recharging mode, the electric vehicle may activate the PLC controller 210 and the battery management controller 230 of FIG. 2 and initiate the quick recharge process together with the charger (S604 to S605).

The electric vehicle may determine whether the quick recharge process fails (S606). In this case, as the determination result, when the quick recharge process fails, the electric vehicle may check whether a recharging mode identified through a duty cycle of a PWM signal received through a control pilot port is a slow recharge mode (S607).

As the determination result, when the current mode is the slow recharge mode, the electric vehicle may initiate a slow recharge process together with the charger and perform slow recharge (S608 to S609).

Then upon detecting recharging complete through a duty cycle of a PWM signal received through a control pilot port, the electric vehicle may perform a predetermined recharging complete procedure (S610).

As the determination result of operation S603 above, when the current mode is not a quick recharging mode, that is, the current mode is a slow recharge, the electric vehicle may enter operation 607 above.

In operation 606 above, when the quick recharge process is normally completed, the electric vehicle may perform quick recharge (S611).

In addition, in operation 607 above, after the quick recharge process fails, when a PWM signal having a duty ratio corresponding to a slow recharge mode is not received through a control pilot port within a predetermined time period, the electric vehicle may determine a current situation as failure in recharging and display failure in recharging through a screen, e.g., which includes a vehicle head unit or a cluster, installed in the electric vehicle (S612).

Figure 7:
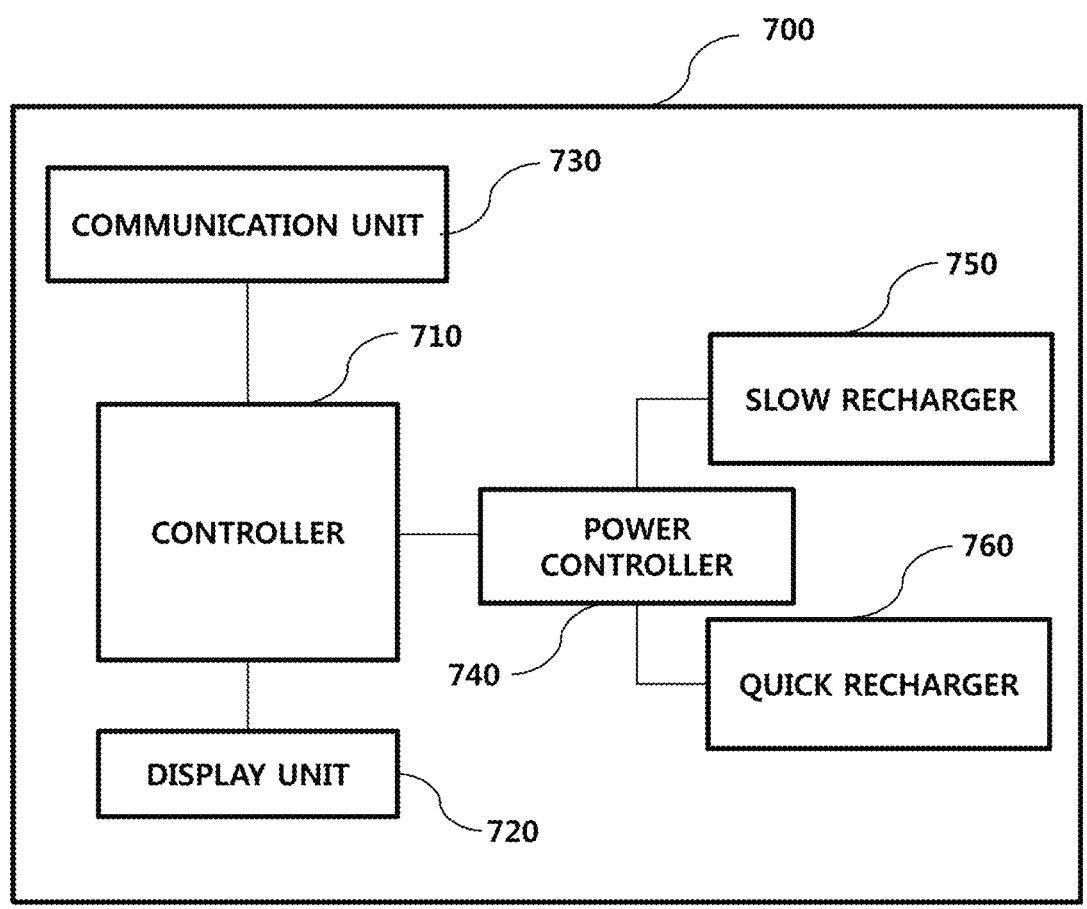
FIG. 7 is a block diagram for explanation of a structure of a charger according to embodiments of the present disclosure.

FIG. 7 is a block diagram for explanation of a structure of a charger 700 according to embodiments of the present disclosure.

As shown in FIG. 7, the charger 700 may include a controller 710 for control of an overall operation of the charger 700, a display unit 720, a communication unit 730, a power controller 740, a slow recharger 750, and a quick recharger 760. The aforementioned components of the charger 700 of FIG. 7 are not necessary component, and thus the charger 700 may include more or fewer components than the above listed components.

In particular, although FIG. 7 does not illustrate a connector for recharging, it is apparent to one of ordinary skill in the art that the connector for recharging needs to be installed for electric vehicle recharging.

When the controller 710 detects that the recharging connector is connected to an electric vehicle inlet, the recharging connector is removed from a holder installed in the charger, or a user selects a predetermined menu for recharging mode selection in an installed monitor, the controller 710 may perform control to configure a predetermined recharging mode selection image and to output the image through the display unit 720.

In particular, upon checking that the quick recharging mode is selected by the user and the quick recharge process fails during the quick recharge process, the controller 710 according to the present disclosure may perform control to transmit a predetermined control signal to the communication unit 730 and to transmit a PWM signal corresponding to a slow recharging mode.

In addition, when the quick recharging mode is selected by the user in a predetermined recharging mode selection image, the controller 710 may configure a predetermined automatic slow recharge conversion mode selection image and to output the image through the display unit 720. In this case, the controller 710 may perform control so as to automatically perform slow recharge only when the automatic slow recharge conversion mode is activated by the user in the automatic slow recharge conversion mode selection image and quick recharge fails.

The communication unit 730 may generate a power line communication signal and a PWM signal according to a control signal of the controller 710 and transmit the signals to the electric vehicle through an installed control pilot port.

In addition, the communication unit 730 may decode a power line communication signal received through the control pilot port and transmit the signal to the controller 710.

In particular, the communication unit 730 may control a duty cycle of a PWM signal according to a control signal of the controller 710. The electric vehicle may identify whether recharging is completed as well as may identify a recharging mode through a duty cycle of the PWM signal.

The power controller 740 may activate the slow recharger 750 or the quick recharger 740 according to a control signal of the controller 710. In addition, the power controller 740 may set a recharge parameter for slow recharge or quick recharge according to a control signal of the controller 710.

The slow recharger 750 may supply power corresponding to the slow recharging mode to the electric vehicle through the L1 port and N port of the recharging port.

The quick recharger 760 may supply power corresponding to the quick recharging mode to the electric vehicle through the DC(+) port and DC(−) port of the recharging connector.

Although thus far, the electric vehicle recharging system for automatically converting a current mode into a slow recharging mode when quick recharge fails has been described with reference to FIGS. 1 to 7, these are merely embodiments described for demonstration purposes, and thus, other embodiments of the present disclosure may propose an electric vehicle recharging system for automatically converting a current mode into a quick recharging mode when slow recharge fails. For example, when a user selects a slow recharging mode through a predetermined recharge mode selection image and activates an automatic quick recharge conversion mode indicating automatic conversion into a quick recharging mode in the case of failure in slow recharge, if the slow recharge process fails, the charger may automatically generate a PWM signal having a duty cycle corresponding to a quick recharging mode and may transmit the PWM signal to the electric vehicle through a control pilot port to initiate the quick recharge process.

According to embodiments of the present disclosure, the following advantages may be achieved.

The present disclosure provides a method and recharging system for automatically selecting a recharging mode of an electric vehicle. The present disclosure further provides a method and recharging system for automatically selecting a recharging mode of an electric vehicle, for automatically performing slow recharge when quick recharge fails in a combo method. The present disclosure also minimizes user inconvenience during electric vehicle recharging.

The aforementioned disclosure can be embodied as a computer readable code in a computer readable recording medium. The computer readable recording medium is any data storage device that can store data which can be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc.

It will be apparent to those skilled in the art that various modifications and variations can be made in the present disclosure without departing from the spirit or scope of the disclosures. Thus, it is intended that the present disclosure covers the modifications and variations of this disclosure provided they come within the scope of the appended claims and their equivalents.

What is claimed is:

1. A method for automatically selecting a recharging mode of a charger, the method comprising:

displaying, by a display unit, a predetermined recharging mode selection image for receiving a selection of a recharging mode;

displaying, by the display unit, a predetermined automatic recharging conversion mode selection image for checking whether a current mode is automatically converted into a second recharging mode when the recharging mode selected via the recharging mode selection image is a first recharging mode;

generating and transmitting, by a communication unit, a first pulse width modulation signal having a duty cycle corresponding to the first recharging mode according to a first control signal of a controller when an automatic recharging conversion is activated via the automatic recharging conversion mode selection image;

generating and transmitting, by the communication unit, a second pulse width modulation signal having a duty cycle corresponding to the second recharging mode according to a second control signal of the controller when a first recharge process corresponding to the first recharging mode fails; and performing a power line communication with an electric vehicle, wherein an onboard charger of the electric vehicle automatically selects a second recharge process corresponding to the second recharging mode when the first recharge process fails.

2. The method according to claim 1, wherein the first and second pulse width modulation signal are transmitted to the electric vehicle through a control pilot port included in a connector of the charger.

3. The method according to claim 1, wherein the first recharging mode is a quick recharging mode, and the second recharging mode is a slow recharging mode.

4. The method according to claim 3, wherein the duty cycle corresponding to the first recharging mode is less than the duty cycle corresponding to the second recharging mode.

5. The method according to claim 1, further comprising generating and transmitting, by the communication unit, a third pulse width modulation signal with a duty cycle of 100% according to a third control signal of the controller upon completing recharging in the first recharging mode or the second recharging mode.

6. The method according to claim 1, wherein the first recharging mode is a slow recharging mode, and the second recharging mode is a quick recharging mode.

7. The method according to claim 6, wherein the duty cycle corresponding to the first recharging mode is greater than the duty cycle corresponding to the second recharging mode.

* * * * *